Nov. 17, 1953  A. WARREN  2,659,805
PRESSURE COOKER
Filed July 11, 1949  3 Sheets-Sheet 1
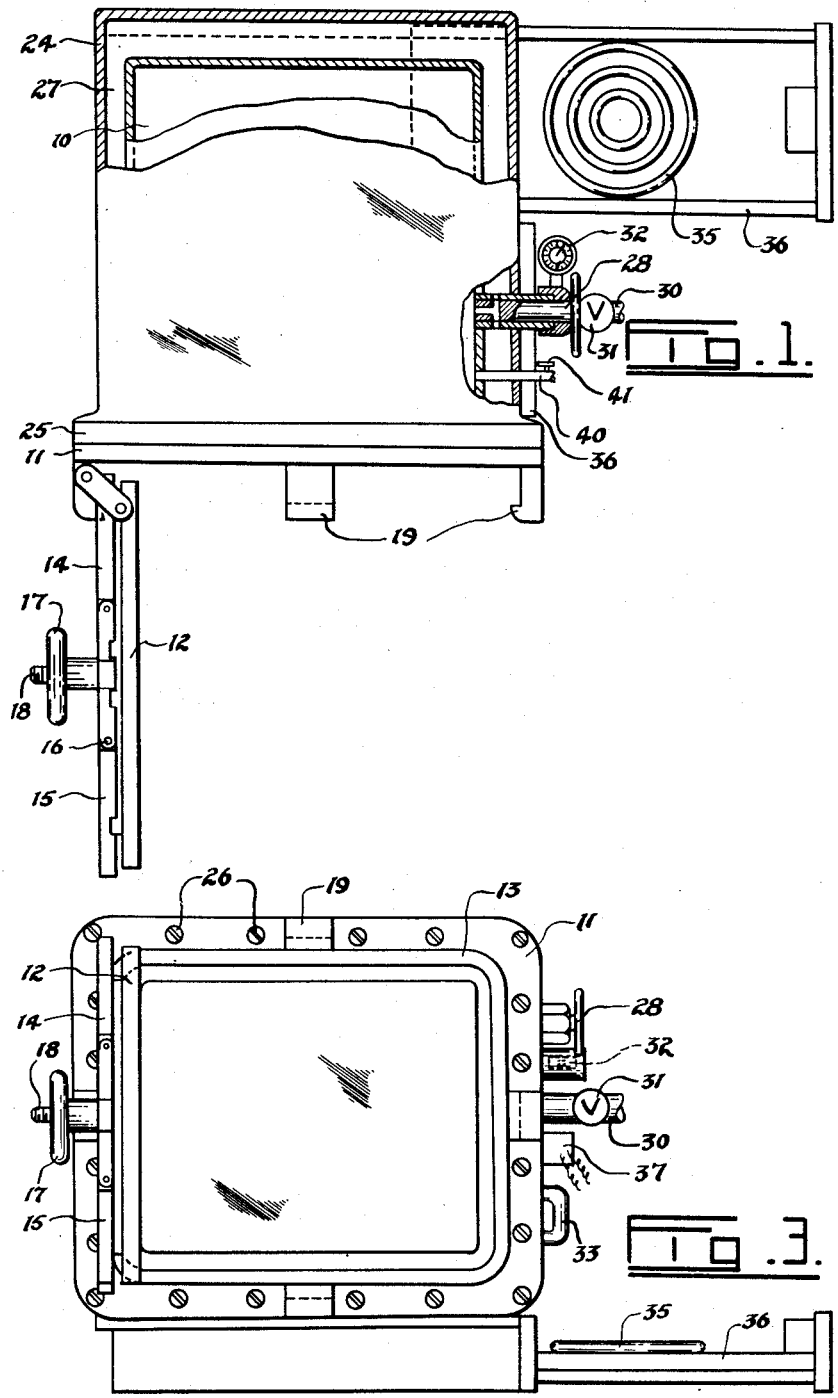
INVENTOR
ALFRED WARREN
BY
Fetherstonhaugh & Co
ATTORNEYS

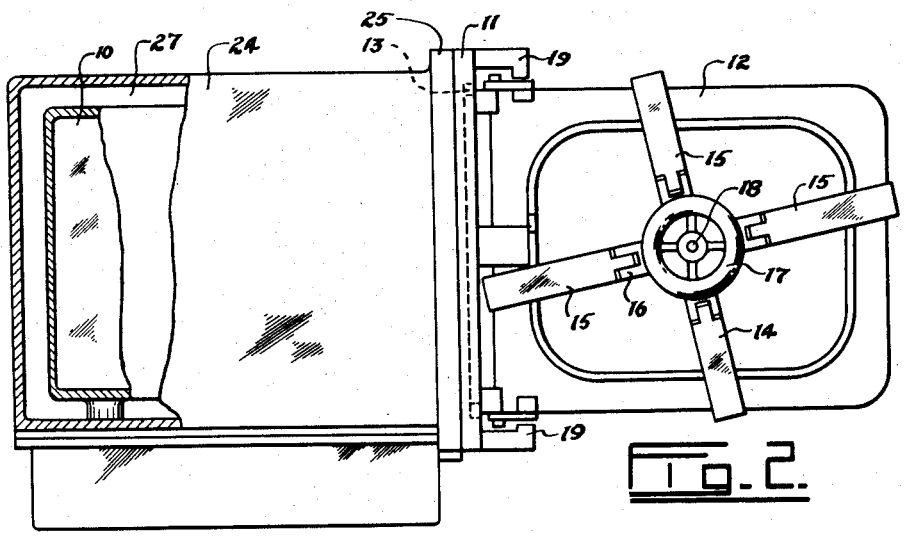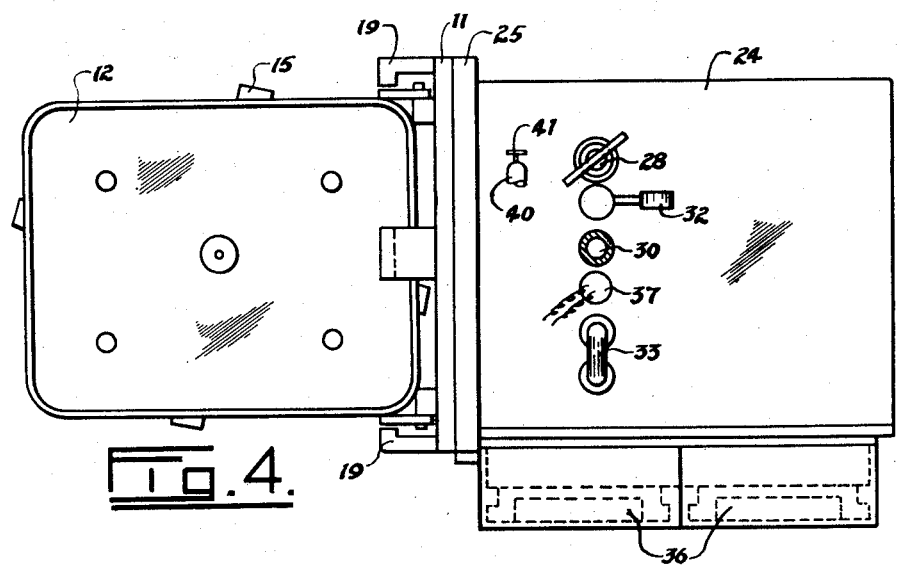

Nov. 17, 1953    A. WARREN    2,659,805
PRESSURE COOKER
Filed July 11, 1949    3 Sheets—Sheet 3
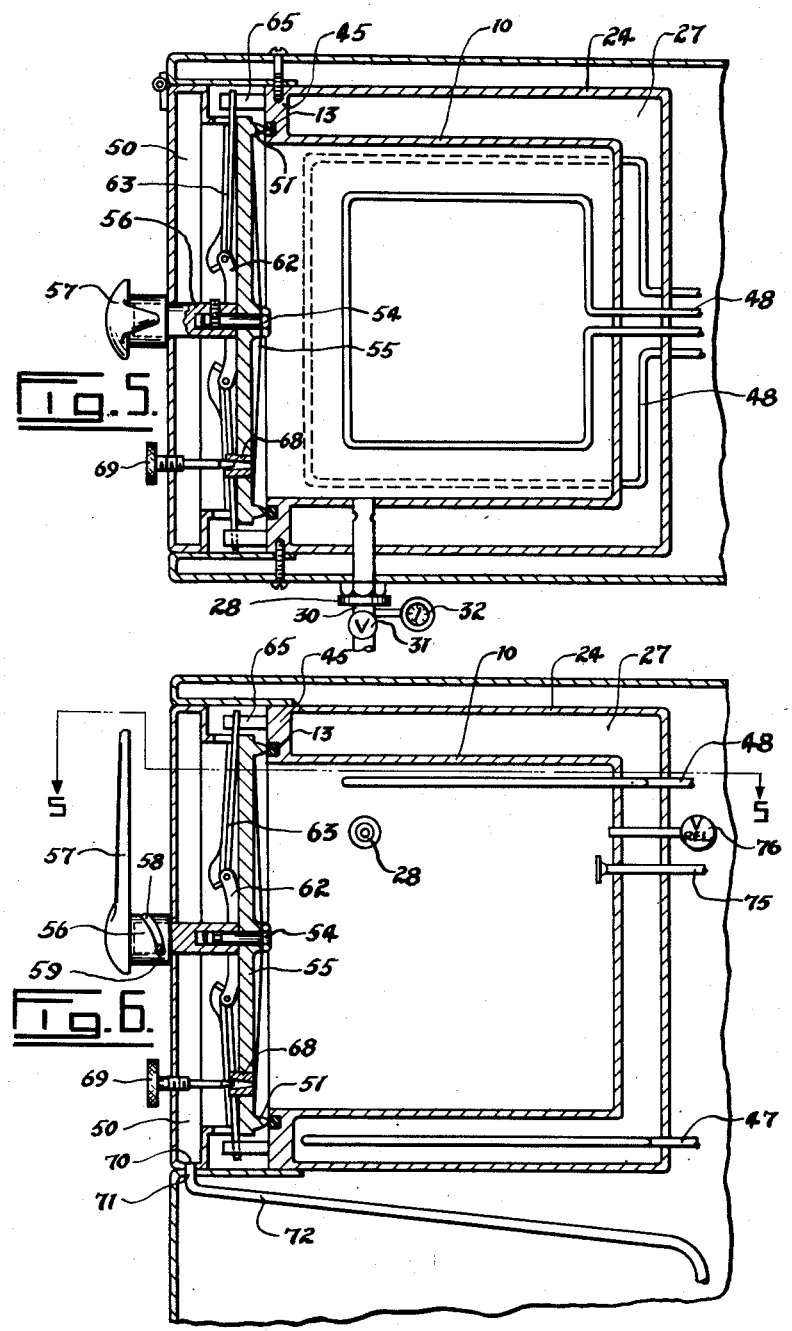
INVENTOR
ALFRED WARREN
BY
Fetherstonhaugh & Co.
ATTORNEYS Patented Nov. 17, 1953

2,659,805

UNITED STATES PATENT OFFICE 2,659,805

PRESSURE COOKER

Alfred Warren, Vancouver, British Columbia, Canada

Application July 11, 1949, Serial No. 104,092

2 Claims. (Cl. 219—44)

This invention relates to improvements in pressure cookers.

This application is a continuation in part of the applicant's application Serial No. 697,221, filed September 16, 1946, now abandoned as to subject matter common therewith.

An object of the present invention is the provision of a pressure cooker which will cook food in less time than now required by devices of this nature, and which maintains the natural flavour and freshness of the food.

Another object is the provision of a pressure cooker which may be used as an oven wherein the food is subjected to dry heat, or in which the food may be subjected to moist heat without coming into direct contact with water.

A further object is the provision of a cooker which is a complete device within itself, and the heating elements of which may be used for other purposes.

Still another object is the provision of a pressure cooker which is absolutely safe to use.

Yet another object is the provision of a pressure cooker which may be opened without losing its pressure.

A still further object is the provision of a pressure cooker, the pressure of which may be dropped instantly and restored almost as quickly.

With the above and other objects in view, the present invention consists essentially of a pressure cooker comprising a cooking chamber, a pressure door for the chamber, means for removably locking the door closed, a jacket surrounding the chamber adapted to contain water, and means for heating the water to form steam in the jacket, as more fully described in the following specification and illustrated in the accompanying drawings, in which, Figure 1 is a plan view, partly in section, of the pressure cooker with its door open, Figure 2 is a side elevation, partly in section thereof, Figure 3 is a front view looking into the cooking chamber, Figure 4 is a view of the side of the cooker opposite that shown in Figure 2, Figure 5 is a vertical section through an alternative form of pressure cooker and Figure 6 is a horizontal section through the alternative of Figure 5.

Referring more particularly to the drawings, 10 is a cooking chamber of any desired size which is open at one side and has a flange 11 around said side. A pressure door 12 is hingedly mounted on this flange and is adapted to close the open side of the chamber. A gasket 13 is mounted in a groove in the flange 11 and extends around the periphery of the door when the latter is closed. The door is held tightly closed by a spider 14, each leg 15 of which is formed in two sections joined by a hinge 16. A hand wheel 17 is threaded on a stud 18 and connected to the inner sections of the legs 15 so that when the wheel is turned in or out, said inner sections move in or out with it, thus moving the outer sections towards or away from the centre of the door. These outer sections are adapted to fit beneath L-shaped lugs 19 projecting outwardly from the flange 11 adjacent its periphery.

In order to release and open the door, it is only necessary to turn the hand wheel outwardly to withdraw the outer sections of the spider legs at least part way from beneath the lugs 19 and then turn the spider completely to move the legs away from said lugs, as clearly shown in Figure 2.

A jacket 24, surrounding and spaced from the cooking chamber 10, is open at one side and has a flange 25 around said open side which is secured to the flange 11 in any suitable manner, such as by screws 26. This jacket forms a space 27 between itself and the chamber 10 which is adapted to contain some water. The space 27 may be selectively brought into communication with the interior of the cooking chamber by means of a valve 28.

Water may be supplied to the space 27 of the jacket in any suitable manner, but it is preferable to have a pipe 30 with a valve 31 therein extending from a source of supply. A pressure gauge 32 may be supplied for registering the pressure in the jacket, and a gauge glass 33 may also be provided for indicating the depth of the water within said jacket.

The jacket and cooking chamber may be heated in any suitable manner. One method of accomplishing this is by means of one or more electrical heating elements 35 mounted in one or more trays 36 slidably mounted beneath the jacket. An automatic thermostat 37 is provided for regulating the temperature inside the jacket by controlling the electrical current supplied to the heating element or elements.

Suitable means may be provided for quickly reducing the pressure in the chamber 10. One way of doing this is to provide a pipe 40 leading from said chamber and having a control valve 41 therein. This pipe may discharge at a point remote from the cooker.

In use the food to be cooked is placed in the chamber 10 and the door 12 clamped closed. The heating elements are turned on after it is certain that there is some water, but not a lot, in the jacket. The valve 28 is preferably left closed. If the food is to be baked, this valve is not opened, but if it is desired to cook it by means of moist heat, the valve is opened after the jacket has become filled with steam. In either case, the cooking chamber is surrounded by steam as well as being placed over the heating elements so that the food is cooked very rapidly under pressure. When the valve is open, the food is cooked a little faster because of its direct contact with the steam.

The pressure gauge 32 indicates the pressure in the jacket, while the automatic thermostat 37 prevents said pressure from getting too high. By mounting the heating elements in the slidable trays 36, they are removable so that either or both may be drawn out as shown in Figure 1 to be used for other purposes, such as heating a tea kettle or the like.

One of the big advantages of this device lies in the fact that the water in the jacket may be heated while the food to be cooked is being prepared. This preheats the cooking chamber walls. The door of the cooking chamber may be opened without losing any pressure even though the steam may have reached the normal cooking pressure. Once the door is closed, it is only necessary to operate the valve 28 to permit steam to enter the chamber. In this way, the pressure in the cooking chamber is brought up to the desired point instantly so that there is no waiting for this to take place. If additional food is to be inserted into the chamber, the valve may be operated to close off the steam from the chamber, and the valve 41 opened to allow the pressure immediately to drop so that the door may be opened. When the additional food is inserted and the door closed, the pressure may be instantly brought up to the desired point by closing valve 41 and opening valve 28 again.

Figures 5 and 6 illustrate an alternative form of the invention in which the door locking mechanism and heating means are different from those shown in Figures 1 to 4. In this alternative, the cooking chamber 10 and the jacket 24 are connected together at the front of the device, as at 45, but the space 27 still exists between these elements. In place of the heating elements 35, an electric immersion heater 47 is provided in the space 27 between the jacket and the cooking chamber beneath the latter. This heater is arranged low enough in the device that it will be covered by or in contact with the water which is placed within the jacket. If desired, a super heater 48 may be provided at the top of the device. This heater may be within the cooking chamber, as shown in full lines, or it may be located above the cooking chamber within the jacket, as indicated in broken lines in Figure 5. Furthermore, a super heater may be provided both within the cooking chamber and above the latter.

The door arrangement of Figures 1 to 4 may also be used in the alternative of Figures 5 and 6, although another type of door and locking mechanism is illustrated in these figures. In this example, a hollow door 50 may be hingedly mounted on the device, said door having an inwardly projecting flange 51 shaped to correspond with and bear against the gasket 13 of the device. A stud 54 extends inwardly from the inner wall 55 of the door centrally thereof, and a sleeve 56 is movably mounted on said stud and projects through the front wall of the door. A handle 57 is rotatably mounted on the outer part of the sleeve 56 and has a spiral slot 58 therein through which one or more pins 59 on the sleeve project. A frame 62 is fixedly mounted on the sleeve and has a plurality of arms 63 pivotally mounted thereon and projecting outwardly therefrom. These arms extend outwardly through the edge of the door and are adapted to engage lugs 65 mounted on the main portion of the device.

When the door 50 is closed, the handle 57 is turned so that the sleeve 56 is in its innermost position. At this time, the arms 63 are extended outwardly from the door and engage the lugs 65. When it is desired to open the door, the handle 57 is turned. During the first of this turning motion, the pin or pins 59 are moved along the slot 58 of the handle and this draws the sleeve and the base 62 outwardly, thus drawing the outer ends of the arms 63 inwardly. Furthermore, turning of the handle, turns the base so that the arms are moved from beneath the lugs 65. The door may now be opened.

In place of the pipe 40 and valve 41 for reducing the pressure in the cooking chamber, a short tube 68 may extend through the inner wall 55 of the door to bring the interior of the door into communication with the interior of the cooking chamber 10. A valve 69 is threaded through the front wall of the door and extends into this tube. When this valve is turned inwardly, the tube is closed, and when it is turned outwardly, air in the cooking chamber may escape into the hollow door. A hole 70 is formed in the bottom edge of the door and this is adapted to register with another hole 71 formed in the frame of the device around the door when said door is closed. A pipe 72 may lead from the hole 71 to discharge at any convenient point.

If desired, a pressurestat 75 may be provided which automatically turns off the heaters 47 and 48 whenever the pressure within the chamber 10 reaches a predetermined point. As a further safety measure, a pressure relief valve 76 may be provided.

The pressure cooker of Figures 5 and 6 operates in the same manner as the previously described one, but it heats up much more rapidly. When it is desired to lower the pressure in the cooking chamber, it is only necessary to turn the valve 69 to allow the air or steam to escape through the pipe 72.

What I claim as my invention is:

1. A pressure cooker comprising a cooking chamber, a pressure door for the chamber, means for removably locking the door closed, means completely sealing the door when it is locked closed, a jacket surrounding the chamber adapted to contain water, an immersion heater in the jacket beneath the water level to form steam in said jacket, an opening in a defining wall of the chamber for bringing the interior of the chamber into direct communication with the outside atmosphere, and a valve for controlling the opening selectively operable outside the chamber to release the pressure in the latter after it has been raised by heating in order that the chamber door may be opened without lowering the pressure in the jacket.

2. A pressure cooker comprising a cooking chamber, a pressure door for the chamber, means for removably locking the door closed, means completely sealing the door when it is locked closed, a jacket surrounding the chamber adapted to contain water, an immersion heater in the jacket adjacent the bottom thereof, another heater near the top of the chamber, means for selectively admitting steam from the jacket into the cooking chamber, an opening in a defining wall of the chamber for bringing the interior of the chamber into direct communication with the outside atmosphere, and a valve for controlling the opening selectively operable outside the chamber to release the pressure therein after it has been raised by heating in order that the chamber door may be opened without lowering the pressure in the jacket.

ALFRED WARREN.

References Cited in the file of this patent

UNITED STATES PATENTS

| Number | Name | Date |
|---|---|---|
| 397,709 | Filer | Feb. 12, 1889 |
| 771,013 | Herdrich | Sept. 27, 1904 |
| 1,047,418 | Kercher | Dec. 17, 1912 |
| 1,097,126 | Goff | May 19, 1914 |
| 1,208,041 | Steere | Dec. 12, 1916 |
| 1,453,255 | Poppert | Apr. 24, 1923 |
| 1,550,707 | Moore | Aug. 25, 1925 |
| 1,892,169 | Simonds | Dec. 27, 1932 |
| 1,958,590 | Pierce | May 15, 1934 |
| 1,983,118 | Bourque | Dec. 4, 1934 |
| 2,235,911 | Wilcox | Mar. 25, 1941 |
| 2,236,837 | Rimmel | Apr. 1, 1941 |
| 2,326,162 | O'Connor et al. | Aug. 10, 1943 |
| 2,339,974 | Austin | Jan. 25, 1944 |
| 2,357,634 | Crites | Sept. 5, 1944 |
| 2,380,121 | Robertson | July 10, 1945 |
| 2,434,016 | Shields | Jan. 6, 1948 |
| 2,471,609 | Charbonneau | May 31, 1949 |
| 2,537,695 | Page | Jan. 9, 1951 |
| 2,558,294 | Finizie | June 26, 1951 |

FOREIGN PATENTS

| Number | Country | Date |
|---|---|---|
| 36,353 | Sweden | June 15, 1911 |
| 923,074 | France | June 26, 1947 |